United States Patent Office 2,982,775
Patented May 2, 1961

2,982,775

11-OXIMINO-, AMINO- AND ACYLAMINO-STEROIDS

Eugene P. Oliveto, Bloomfield, and Richard C. Rausser, Newark, N.J., assignors to Schering Corporation, Bloomfield, N.J., a corporation of New Jersey No Drawing. Filed May 6, 1957, Ser. No. 657,030

20 Claims. (Cl. 260—397.45)

This invention relates to novel 11-oximino steroids of the pregnane series and to methods of making them and the novel 11-amino and 11-acylamino steroids of the pregnane series derivable therefrom.

It has been generally believed that 11-ketosteroids were unreactive towards hydroxylamine (cf. Bladon, J. Chem. Soc., 1953, 2921; Fieser and Fieser, "Natural Products Related to Phenanthrene," p. 409, 655) and many examples are available in the literature in which a polyketosteroid (containing one of its ketone groups at C-11) is treated with hydroxylamine in the usual fashion to replace ketone functions with oxime functions at all positions except at C-11 [see Oliveto, Rausser, Weber, Shapiro, Gould and Hershberg, J. Am. Chem. Soc., 78, 1736 (1956)].

We have discovered that the conversion of 11-ketosteroids of the pregnane series to 11-oximinosteroids (I) may be effected in good yield by the action of hydroxylamine with an acid catalyst, such as hydroxylamine hydrochloride, pyridine hydrochloride and the like, preferably in a refluxing solvent such as pyridine, methanol and the like. Starting materials are 11-ketosteroids with no other free ketone group in the molecule.

These new oximes are useful for the preparation of 11-aminosteroids, a hitherto unknown class of compounds. Two types may be prepared: 11α-amines (IIa) and 11β-amines (IIb) depending on the type of reduction and the choice of reducing agent which is employed to transform the oxime to amine. In general, 11-oximes reduce in a stereochemical fashion similar to 11-ketones; that is, the use of sodium in alcohol or sodium amalgam will produce the 11α-amines, while lithium aluminum hydride, or catalytic reduction (in an acid medium) gives the 11β-amines.

The 11-amino steroids may be converted into a variety of 11-acylamino steroids having cortical hormone activity. The new 11-acylamino steroids of the pregnane series corresponding apart from the 11-acylamino to cortisone, cortisol, prednisone and prednisolone are particularly effective anti-inflammatory agents.

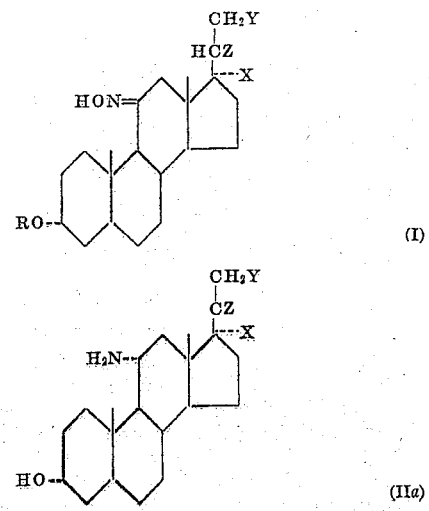

(I)

(IIa)

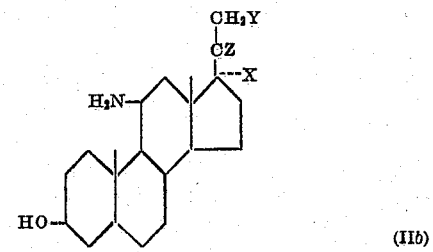

(IIb)

R=hydrogen or lower alkanoyl
X=hydrogen or hydroxyl
Y=hydrogen, hydroxyl or lower alkanoyloxy

The following examples are illustrative of the methods and products of the invention:

Example 1

*11-oximinopregnane-3α,17α,20β-triol* (*I*).—A solution of 10 g. of pregnane-3α,17α,20β-triol-11-one and 10 g. of hydroxylamine hydrochloride in 100 ml. of 90% pyridine-10% water is refluxed for 17 hours. The mixture is then concentrated to ca. ½ volume, water added to incipient cloudiness, and the solution heated to boiling. The addition of ca. 50 ml. of methanol causes the precipitation of crystals. Upon cooling, the crystals are removed by filtration: 8.7 g. (81%) M.P. 258–262° C. dec.; crystallized from ethanol, M.P. 272.4–273.4° C. dec., [α]$_D$+55.4° (dioxane).

The triacetate is prepared by reaction of I with acetic anhydride and pyridine overnight at room temperature. Crystallized from methanol, the product melts at 217.2–218.0° C., [α]$_D$+81.5° (dioxane).

Example 2

*11α-aminopregnane-3α,17α,20β-triol* (*IIa*).—To a solution of 10.0 g. of I in 2.5 l. of n-propyl alcohol is added 150 g. of sodium over a period of 15 minutes. The mixture is then refluxed until all the sodium has dissolved (ca. 2¾ hours) and then for ¾ hour more. Ca. 500 ml. of water is added, and the solution steam distilled to remove organic solvent, cooled and filtered to give 10.68 g., M.P. 180–185° C. dec., crystallized from acetonitrile, M.P. 190.0–192.0° C. dec., [α]$_D$−50.9° (dioxane).

Example 3

*11-oximinopregnane-3α,20β-diol* (*III*).—A solution of 88 g. of 3α,20β-dihydroxypregnan-11-one and 88 g. of hydroxylamine hydrochloride in 792 ml. of pyridine and 88 ml. of water is refluxed for 18 hours, then poured into ice and hydrochloric acid and filtered. Two recrystallizations from aqueous ethanol give 80 g. (74%), M.P. 216–219° C., [α]$_D$+69.1° (dioxane).

Example 4

*11α-aminopregnane-3α,20β-diol.*—To a solution of 5.0 g. of III in 1.25 l. of n-propyl alcohol is added 75 g. of sodium during 10 minutes. The mixture is refluxed 5 hours, then 125 ml. of water is added, and the organic solvent removed by steam distillation. After cooling, the solids are removed by filtration, dried and crystallized from acetonitrile to give 3.40 g. (71%), M.P. 181–187° C.; crystallized once more, M.P. 187–191° C., [α]$_D$ −10.1° (dioxane).

Example 5

*11α-aminopregnane-3α,17α,21-triol-20-one.*—A solution of 1.0 g. of pregnane-3α,17α,21-triol-11,20-dione and 10 mg. of p-toluenesulfonic acid in 100 ml. of benzene and 4 ml. of ethylene glycol is refluxed for 7 hours with the continuous removal of water. The solution is then cooled, made alkaline with methanolic potassium hydroxide, washed with water and steam distilled to precipitate 0.7 g. of pregnane-$3\alpha,17\alpha,21$-triol-11,20-dione 20-ethylene ketal, M.P. 175–180° C. Treatment of this compound with acetic anhydride and pyridine at room temperature for 4 hours gives the 3,21-diacetate.

A solution of 0.5 g. of the diacetate in 25 ml. of 80% aqueous pyridine containing 1 g. of hydroxylamine hydrochloride is refluxed for 16 hours. The mixture is concentrated to a residue which is then crystallized from aqueous methanol to give 11-oximinopregnane-$3\alpha,17\alpha,21$-triol-20-one-3,21-diacetate 20-ethylene ketal.

Reduction of 0.4 g. of this compound with sodium in isopropyl alcohol in the usual way produces $11\alpha$-aminopregnane-$3\alpha,17\alpha,21$-triol-20-one 20-ethylene ketal. Warming with dilute acetic acid (80%) for 2 hours on the steam bath, then diluting with water and cooling gives $11\alpha$-aminopregnane-$3\alpha,17\alpha,21$-triol-20-one.

Example 6

$11\beta$-aminopregnane-$3\alpha,20\beta$-diol.—A solution of 1.0 g. of 11-oximinopregnane-$3\alpha,20\beta$-diol in 50 ml. of acetic acid is hydrogenated at room temperature and atmospheric pressure overnight with the aid of 500 mg. of platinum oxide. The catalyst is removed by filtration, and the acetic acid neutralized with dilute sodium hydroxide to precipitate 800 mg. of $11\beta$-aminopregnane-$3\alpha,20\beta$-diol.

Example 7

$11\beta$-aminopregnane-$3\alpha,17\alpha$-20-triol.—The 11-oxime of pregnane-$3\alpha,17\alpha,20$-triol-11-one is dissolved in 10 ml. of acetic acid and reduced with hydrogen by means of platinum oxide catalyst. One mole of hydrogen is taken up overnight. The catalyst is removed by filtration, and the addition of aqueous sodium hydroxide to pH 8 precipitates $11\beta$-aminopregnane-$3\alpha,17\alpha,20$-triol.

Example 8

$11\alpha$-aminopregnane-$3\alpha,17\alpha,20,21$-tetrol.—One gram of pregnane-$3\alpha,17\alpha,20,21$-tetrol-11-one is converted to its 11-oxime by refluxing in methanol containing hydroxylamine hydrochloride for 40 hours. The oxime is reduced by means of sodium in normal butyl alcohol to yield $11\alpha$-aminopregnane-$3\alpha,17\alpha,20,21$-tetrol.

Example 9

$11\beta$-aminopregnane-$3\alpha,17\alpha,20,21$-tetrol.—The oxime of pregnane-$3\alpha,17\alpha,20,21$-tetrol-11-one is dissolved in 20 ml. of tetrahydrofuran and a solution of 3 g. of lithium aluminum hydride and 5.0 ml. of tetrahydrofuran is added cautiously. The mixture is then refluxed for 19 hours, and the excess hydride dissolved by the addition of acetic anhydride. The mixture is steam distilled and extracted with methylene chloride. The organic extracts are washed with water, dried and evaporated to a residue. Crystallization from aqueous methanol gives $11\beta$-acetamido-$3\alpha,17\alpha,20,21$-tetrol-3,20,21-triacetate. Hydrolysis by means of refluxing aqueous methanolic sodium hydroxide for 24 hours gives $11\beta$-aminopregnane-$3\alpha,17\alpha,20,21$-tetrol.

Example 10

$11\alpha$-aminoallopregnane-$3\beta,17\alpha,20,21$-tetrol.—One gram of 11-ketoallopregnane-$3\beta,17\alpha,20,21$-tetrol is converted to its 11-oxime by the method of Example 8. This oxime, dissolved in 20 ml. of methanol, is reacted with 1 g. of sodium amalgam. After the reaction has subsided, the mixture is filtered and water is added to the filtrate to precipitate $11\alpha$-aminoallopregnane-$3\beta,17\alpha,20,21$-tetrol.

Example 11

$11\beta$-aminoallopregnane-$3\beta,17\alpha,20,21$-tetrol.—The 11-oxime of 11-ketoallopregnane-$3\beta,17\alpha,20,21$-tetrol is dissolved in 20 ml. of acetic acid and reduced by means of hydrogen and platinum oxide catalyst. After hydrogenation overnight, the reaction is stopped, the catalyst removed by filtration, and water added to the filtrate to precipitate $11\beta$-aminoallopregnane-$3\beta,17\alpha,20,21$-tetrol.

The $11\alpha$-acylamino compounds can be prepared from $11\alpha$-aminopregnane-$3\alpha,17\alpha,20\beta$-triol. This compound is acylated by means of a lower alkanoic acid anhydride and pyridine to give the N,O,O-triacyl derivative. Treatment with refluxing aqueous methanolic sodium hydroxide solution for a short time removes the O-acyl groups to give $11\alpha$-acylaminopregnane-$3\alpha,17\alpha,20\beta$-triol. Instead of alkaline, acid conditions (refluxing alcohol containing e.g., p-toluenesulfonic acid) may be used. The triol is then oxidized by means of chromium trioxide-pyridine complex, N-bromoacetamide, N-bromosuccinimide and the like to produce $11\alpha$-N-acylaminopregnan-$17\alpha$-ol-3,20-dione. The 3-ketone can be selectively reduced with sodium borohydride, or with Raney nickel, to give $11\alpha$-N-acylaminopregnane-$3\alpha,17\alpha$-diol-20-one. Bromination at C-21, followed by acetoxylation with potassium acetate gives $11\alpha$-acylamino-21-acetoxypregnane-$3\alpha,17\alpha$-diol-20-one. Oxidation at C-3 with N-bromoacetamide, N-bromosuccinimide or chromium trioxide-pyridine produces the 3-ketone which, on bromination and dehydrobromination by the usual method, produces $11\alpha$-acylamino-21-acetoxy-$\Delta^4$-pregnen-$17\alpha$-ol-3,20-dione. Hydrolysis with acid or alkali gives $11\alpha$-acylamino-$\Delta^4$-pregnene-$17\alpha,21$-diol-3,20-dione. Treatment of this compound with selenium dioxide in refluxing tert.-amyl or tert.-butyl alcohol (or treatment with the known organisms for the introduction of a double bond at C–1) produces $11\alpha$-acylamino-$\Delta^{1,4}$-pregnadiene-$17\alpha,21$-diol-3,20-dione.

The $11\beta$-analogues are prepared in essentially the same fashion, with one important difference. Acylation of $11\beta$-aminopregnane-$3\alpha,17\alpha,20\beta$-triol (e.g., with acetic anhydride and pyridine) can be stopped at the N-acyl stage (without esterification of the hydroxyl groups) to produce $11\beta$-acylaminopregnane-$3\alpha,17\alpha,20\beta$-triol, because this product will precipitate out of the reaction mixture. Oxidation then produces $11\beta$-acylaminopregnan-$17\alpha$-ol-3,20-dione, and the $11\alpha$-sequence is then duplicated.

Example 12

$11\alpha$-acetamidopregnane-$3\alpha,17\alpha,20\beta$-triol 3,20-diacetate (IV).—A solution of 1.54 g. of $11\alpha$-aminopregnane-$3\alpha,17\alpha,20\beta$-triol in 62 ml. of pyridine and 31 ml. of acetic anhydride is allowed to stand at room temperature for 18 hours, then poured into ice-hydrochloric acid and extracted into methylene chloride. The organic extracts are washed three times with water, dried and evaporated to give 2.14 g., M.P. 229–234° C. dec. Crystallizing twice from aqueous methanol gives the hydrate in 80% yield, melting at 246–250° C. dec., $[\alpha]_D$+22.4° (dioxane).

Example 13

$11\alpha$-acetamidopregnane-$3\alpha,17\alpha,20\beta$-triol (V).—A solution of 1.55 g. of IV in 30 ml. of methanol and 4 ml. of water containing 389 mg. of sodium hydroxide is refluxed for ½ hour. Acetic acid is added to neutralize excess alkali, and the solution concentrated to dryness under reduced pressure. Crystallization from acetonitrile gives 1.08 g. (84%), M.P. 266–267° C.; crystallized once more, M.P. 266.8–268.0° C., $[\alpha]_D$−30.1° (methanol).

Example 14

$11\alpha$-acetamidopregnan-$17\alpha$-ol-3,20-dione (VI).—A solution of 10.78 g. of V in 430 ml. of acetone and 105 ml. of water is cooled to 5°, and 1 ml. of concentrated hydrochloric acid and 26.4 g. of N-bromoacetamide are added. The reaction is allowed to proceed in the icebox for 23 hours, then 20 g. of sodium sulfite in water is added. The acetone is removed by steaming, and the remaining mixture made alkaline with sodium hydroxide, cooled and filtered to give 10.28 g., M.P. 268–275° C. dec. Crystallization from acetonitrile gives 7.77 g. (73%), M.P. 288–292° C., $[\alpha]_D +19.1°$ (methanol).

Example 15

11α-acetamidopregnane-3α,17α-diol-20-one (VII).—A solution of 5.00 g. of VI and 500 mg. of sodium borohydride in 60 ml. of pyridine and 2.5 ml. of water is allowed to react at room temperature for 22 hours. Excess reducing agent is destroyed by the addition of concentrated hydrochloric acid, then poured onto ice and excess hydrochloric acid and filtered to give 3.32 g. of VII, M.P. 272–275° C. Two crystallizations from acetonitrile give M.P. 279–283° C. dec., $[\alpha]_D +21.6°$ (methanol).

Example 16

11α-acetamido-21-acetoxypregnane-3α,17α-diol-20-one (VIII).—A mixture of 2.0 g. of VII in 200 ml. of chloroform containing 0.75% of ethanol is saturated with hydrogen bromide, and cooled to −15° C. A solution of 860 mg. of bromine in 50 ml. of chloroform is added dropwise over 1½ hours, maintaining the temperature between −14 and −16° C. The solution is evaporated to a residue under reduced pressure, 600 ml. of acetone, 15 ml. of water and 10 g. of potassium acetate are added and the resulting mixture refluxed 16 hours. The organic solvent is removed under reduced pressure, water is added, and the mixture extracted with methylene chloride. The organic extracts are dried and evaporated to a residue: 2.58 g., M.P. 209–219° C. dec. Two crystallizations from acetonitrile give 1.87 g. (81%), M.P. 223–229° C. dec. $[\alpha]_D +43.5°$ (dioxane).

Example 17

11α-acetamido-21-acetoxypregnan-17α-ol-3,20-dione (IX).—A solution of 1.87 g. of VIII and 2.03 g. of N-bromoacetamide in 94 ml. of 80% aqueous acetone containing one drop of concentrated hydrochloric acid is allowed to react at ca. 5° C. for 17 hours. Excess oxidizing agent is destroyed by the addition of dilute sodium sulfite solution and the acetone removed under reduced pressure. Extraction with methylene chloride, followed by drying and evaporation, gives 1.43 g. (77%), M.P. 214–245° C. Crystallization from ethyl acetate raises the M.P. to 247.8–249.6° C., $[\alpha]_D +46.4°$ (dioxane).

Example 18

11α-acetamido-21-acetoxy-Δ⁴-pregnen-17α-ol-3,20-dione (X).—A solution of 448 g. of IX in 12 ml. of tert.-butyl alcohol and 12 ml. of methylene chloride is treated with 10 mg. of p-toluenesulfonic acid and a solution of 165 mg. of bromine in 4 ml. of tert.-butyl alcohol, and the mixture allowed to react 7 hours at 30° C. The solvents are removed under reduced pressure, and the residual oil is crystallized by the addition of 10 ml. of acetone and 20 ml. of ether to give 500 mg. of 11α-acetamido-21-acetoxy-4-bromopregnan-17α-ol-3,20-dione, M.P. ca. 225° C. dec. A solution of 430 mg. of the bromide and 130 mg. of semicarbazide in 20 ml. tert.-butyl alcohol and 6 ml. of methylene chloride is shaken for 2 hours, then evaporated to a residue under reduced pressure. Five ml. of acetic acid, 2 ml. of water and 2 ml. of 92% pyruvic acid are added, and the resulting solution allowed to stand at room temperature for 20 hours. Sodium acetate is added, and the volume reduced to ca. ⅓ under reduced pressure. Extraction with methylene chloride gives 270 mg. of a resin, which is chromatographed on 9 g. of Florisil. Elution with 3% methanol in methylene chloride gives 160 mg. of crude, and crystallization from ethyl acetate gives 120 mg., M.P. 267.5–270° C., $\lambda_{max}^{MeOH}$ 242 mμ (ε14,000)

Example 19

11α-acetamido-Δ⁴-pregnene-17α-21-diol-3,20-dione (XI).—A solution of 1.0 g. of X in 50 ml. of methanol and 5 ml. of water containing 0.3 g. of sodium carbonate is refluxed in a nitrogen atmosphere for ½ hour. The solution is then concentrated to the appearance of crystals, cooled and filtered to give 0.7 g. of XI.

Example 20

11α-acetamido-Δ¹,⁴-pregnadiene-17α,21-diol-3,20-dione (XII).—A solution of 0.5 g. of XI and 0.5 g. of selenium dioxide in 100 ml. of tert.-butyl alcohol and 4 ml. of acetic acid is refluxed for 12 hours, then concentrated to a residue under reduced pressure. This is triturated with ether, then dissolved in methylene chloride and washed with 5% sodium hydroxide solution twice, then with water, dried and evaporated. The solid is crystallized from acetone-hexane to yield 0.2 g. of XII.

Example 21

11β-acetamidopregnane-3α,17α,20β-triol (XIII).—A solution of 1.00 g. of 11β-aminopregnane-3α,17α,20β-triol in 15 ml. of pyridine containing 0.28 ml. of acetic anhydride begins to deposit crystals within a few minutes. After 25 minutes, the precipitate (0.9 g.) is removed by filtration. Crystallization from methanol-pyridine gives 0.77 g., M.P. >300° C.

Example 22

11β-acetamidopregnan-17α-ol-3,20-dione (XIV).—A solution of 1.3 g. of XIII in 5 ml. of water and 45 ml. of tert.-butyl alcohol is cooled to 4° C., and treated with 2.0 g. of N-bromosuccinimide. The reaction is allowed to proceed at 5° for 37 hours, then dilute sodium sulfite solution is added to destroy excess oxidizing agent. The solution is concentrated under reduced pressure to the appearance of crystals, then cooled and filtered to yield 0.9 g. of XIV.

Example 23

11β-acetamidopregnane-3α,17α-diol-20-one (XV).—A solution of 2.0 g. of XIV in 100 ml. of methanol is hydrogenated at atmospheric pressure and room temperature with the aid of 1 g. of Raney nickel. The reaction is stopped after the uptake of one mole of hydrogen, the catalyst removed by filtration and the methanol solution concentrated by distillation. Addition of water gives crystals of XV.

Example 24

11β-acetamido-21-acetoxypregnane-3α,17α-diol-20-one (XVI).—A mixture of 1.0 g. of XV in 150 ml. of chloroform containing 0.75% of ethanol is saturated with hydrogen bromide and cooled to −15° C. A solution of 430 mg. of bromine in 30 ml. of chloroform is added dropwise over a period of 1 hour, maintaining the temperature at ca. −15° C. The solution is evaporated to a residue under reduced pressure, then 400 ml. of acetone, 10 ml. of water and 6 g. of potassium acetate are added, and this mixture refluxed for 14 hours. The organic solvent is removed under reduced pressure and water added to precipitate XVI.

Example 25

11β-acetamido-21-acetoxypregnan-17α-ol-3,20-dione (XVII).—A solution of 1.5 g. of XVI and 2.0 g. of N-bromosuccinimide in 70 ml. of 80% aqueous acetone is cooled to 5° C. and allowed to react at this temperature for 32 hours. Dilute sodium sulfite solution is added, and the butyl alcohol removed under reduced pressure. Addition of water precipitates 1.2 g. of XVII.

Example 26

11β-acetamido-21-acetoxy-Δ⁴-pregnen-17α-ol-3,20-dione (XVIII).—A solution of 996 mg. of XVII in 25 ml. of tert.-butyl alcohol and 25 ml. of methylene chloride is treated with 10 mg. of p-toluenesulfonic acid and a solution of 330 mg. of bromine in 10 ml. of tert.-butyl alcohol, and the mixture allowed to react 10 hours at room temperature. The solvents are removed under reduced pressure, and the residue (crude 4-bromide) washed with water and dried. This produce is dissolved in 40 ml. of tert.-butyl alcohol and 10 ml. of methylene chloride, along with 260 mg. of semicarbazide, and the mixture shaken for 3 hours, then evaporated to a residue under reduced pressure. A mixture of 10 ml. of acetic acid, 5 ml. of water and 5 ml. of 90% pyruvic acid is added and the resulting solution allowed to stand at room temperature for 24 hours. Excess sodium acetate is added, and the volume reduced to ca. ⅓ under reduced pressure. Addition of water precipitates 750 mg. of XVIII, which is crystallized from aqueous methanol.

*Example 27*

11β - acetamido - Δ⁴ - pregnene - 17α,21 - diol - 3,20-dione (XIX).—A mixture of 0.5 g. of XVIII in 30 ml. of chloroform and 5 ml. of water containing 0.5 ml. of concentrated hydrochloric acid is shaken for 24 hours at room temperature. The chloroform solution is then washed neutral with water, dried and evaporated to give 0.45 g. of XIX.

*Example 28*

11β - acetamido - Δ¹,⁴ - pregnadiene - 17α,21 - diol - 3, 20-dione (XX).—A solution of 0.5 g. of XIX and 0.5 g. of selenium dioxide in 75 ml. of tert.-amyl alcohol and 3 ml. of acetic acid is refluxed for 6 hours, then concentrated to a residue under reduced pressure. This is triturated with ether, then dissolved in methylene chloride and washed with 5% sodium hydroxide solution twice, then with water, dried and evaporated. The solid is crystallized from aqueous acetone to yield 0.25 g. of XX.

From the foregoing examples, it will be clear to those skilled in the art that a number of alternative pathways can be used for making and utilizing the new compounds and procedures of the invention.

We claim:

1. A method of making 11-oximino steroids of the pregnane series which comprises heating at reflux temperature of a solvent for the steroid boiling in the range from about 64° to about 115° C. 11-ketosteroid of the general formula

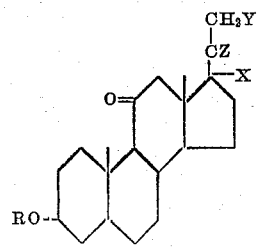

wherein R is selected from the group consisting of hydrogen and lower alkanoyl, X is selected from the group consisting of hydrogen and hydroxyl, Y is selected from the group consisting of hydrogen, hydroxyl and lower alkanoyloxy, and Z is selected from the group consisting of H,βOH and ketal groups, with hydroxylamine hydrochloride.

2. 11-oximino steroids of the general formula

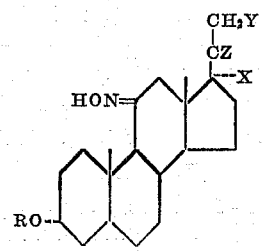

wherein R is selected from the group consisting of hydrogen and lower alkanoyl, X is selected from the group consisting of hydrogen and hydroxyl, Y is selected from the group consisting of hydrogen, hydroxyl and lower alkanoyloxy and Z is selected from the group consisting of H,βOH and ketal groups, Y being H when X is H.

3. A method of making 11α-amino steroids of the pregnane series which comprises reducing an 11-oximino steroid of the general formula

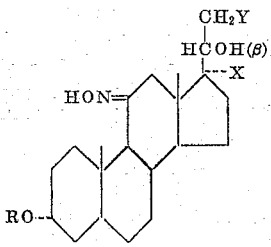

wherein R is selected from the group consisting of hydrogen and lower alkanoyl, X is selected from the group consisting of hydrogen and hydroxyl, and Y is selected from the group consisting of hydrogen, hydroxyl and lower alkanoyloxy with an alkali metal and a lower alkanol, Y being H when X is H.

4. 11α-amino steroids of the general formula

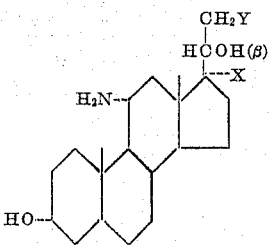

wherein X is selected from the group consisting of hydrogen and hydroxyl, and Y is selected from the group consisting of hydrogen, hydroxyl and lower alkanoyloxy, Y being H when X is H.

5. A method of making 11β-amino steroids of the pregnane series which comprises reducing an 11-oximino steroid of the general formula

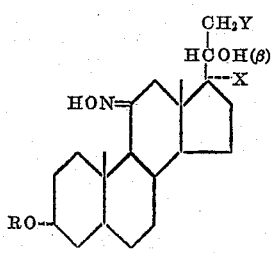

wherein R is selected from the group consisting of hydrogen and lower alkanoyl, X is selected from the group consisting of hydrogen and hydroxyl, and Y is selected from the group consisting of hydrogen, hydroxyl and lower alkanoyloxy, with a reducing agent selected from the group consisting of hydrogen and a platinum hydrogenation catalyst, and lithium alminum hydride, Y being H when X is H.

6. 11β-amino steroids of the general formula

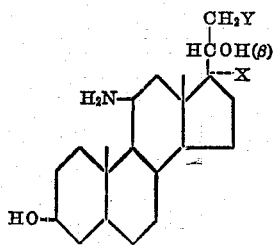

wherein X is selected from the group consisting of hydrogen and hydroxyl, and Y is selected from the group consisting of hydrogen, hydroxyl and lower alkanoyloxy, Y being H when X is H.

7. 11α-acylaminosteroids of the general formula

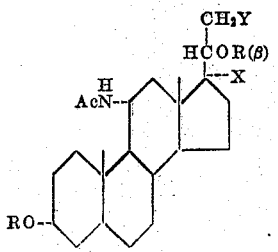

wherein Ac is lower alkanoyl, R is selected from the group consisting of hydrogen and lower alkanoyl, X is selected from the group consisting of hydrogen and hydroxyl, and Y is selected from the group consisting of hydrogen, hydroxyl and lower alkanoyloxy, Y being H when X is H.

8. 11α-acylaminosteroids of the general formula

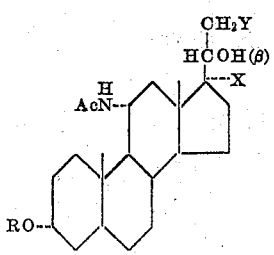

wherein Ac is lower alkanoyl, R is selected from the group consisting of hydrogen and lower alkanoyl, X is selected from the group consisting of hydrogen and hydroxyl, and Y is selected from the group consisting of hydrogen, hydroxyl and lower alkanoyloxy, Y being H when X is H.

9. 11α-acylaminosteroids of the general formula

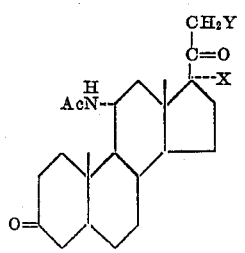

wherein Ac is lower alkanoyl, X is selected from the group consisting of hydrogen and hydroxyl, and Y is selected from the group consisting of hydrogen, hydroxyl and lower alkanoyloxy, Y being H when X is H.

10. 11α-acylaminosteroids of the general formula

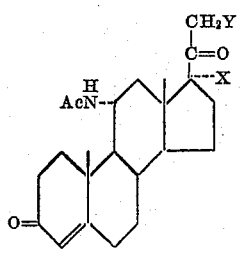

wherein Ac is lower alkanoyl, X is selected from the group consisting of hydrogen and hydroxyl, and Y is selected from the group consisting of hydrogen, hydroxyl and lower alkanoyloxy, Y being H when X is H.

11. 11α-acylaminosteroids of the general formula

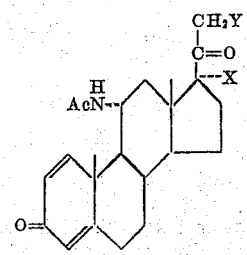

wherein Ac is lower alkanoyl, X is selected from the group consisting of hydrogen and hydroxyl, and Y is selected from the group consisting of hydrogen, hydroxyl and lower alkanoyloxy, Y being H when X is H.

12. 11β-acylaminosteroids of the general formula

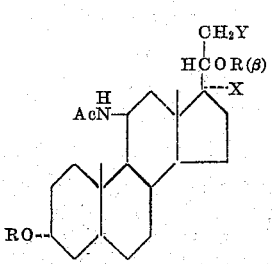

wherein Ac is lower alkanoyl, R is selected from the group consisting of hydrogen and lower alkanoyl, X is selected from the group consisting of hydrogen and hydroxyl, and Y is selected from the group consisting of hydrogen, hydroxyl and lower alkanoyloxy, Y being H when X is H.

13. 11β-acylaminosteroids of the general formula

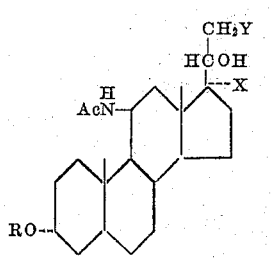

wherein Ac is lower alkanoyl, R is selected from the group consisting of hydrogen and lower alkanoyl, X is selected from the group consisting of hydrogen and hydroxyl, and Y is selected from the group consisting of hydrogen, hydroxyl and lower alkanoyloxy, Y being H when X is H.

14. 11β-acylaminosteroids of the general formula

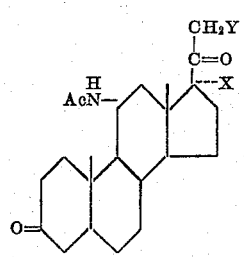

wherein Ac is lower alkanoyl, X is selected from the group consisting of hydrogen and hydroxyl, and Y is selected from the group consisting of hydrogen, hydroxyl and lower alkanoyloxy, Y being H when X is H.

15. 11β-acylaminosteroids of the general formula

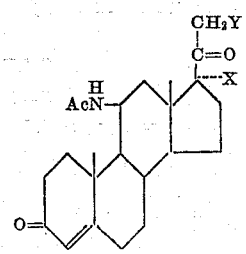

wherein Ac is lower alkanoyl, X is selected from the group consisting of hydrogen and hydroxyl, and Y is selected from the group consisting of hydrogen, hydroxyl and lower alkanoyloxy, Y being H when X is H.

16. 11β-acylaminosteroids of the general formula

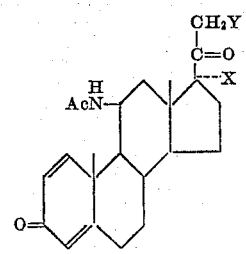

wherein Ac is lower alkanoyl, X is selected from the group consisting of hydrogen and hydroxyl, and Y is selected from the group consisting of hydrogen, hydroxyl and lower alkanoyloxy, Y being H when X is H.

17. 11α-acylaminosteroids of the general formula

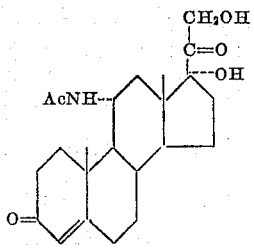

wherein Ac is lower alkanoyl.

18. 11α-acylaminosteroids of the general formula

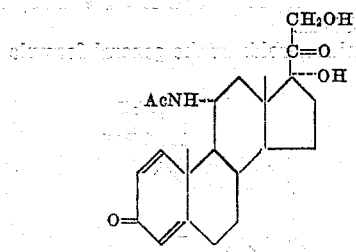

wherein Ac is lower alkanoyl.

19. 11β-acylaminosteroids of the general formula

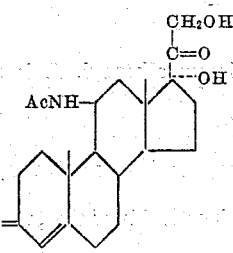

wherein Ac is lower alkanoyl.

20. 11β-acylaminosteroids of the general formula

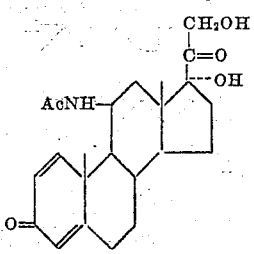

wherein Ac is lower alkanoyl.

References Cited in the file of this patent

UNITED STATES PATENTS

| | | |
|---|---|---|
| 2,769,020 | Hershberg et al. | Oct. 30, 1956 |
| 2,773,076 | Reichstein | Dec. 4, 1956 |